June 18, 1968  J. G. ATTWOOD ETAL  3,388,906
VIBRATING CONVEYOR

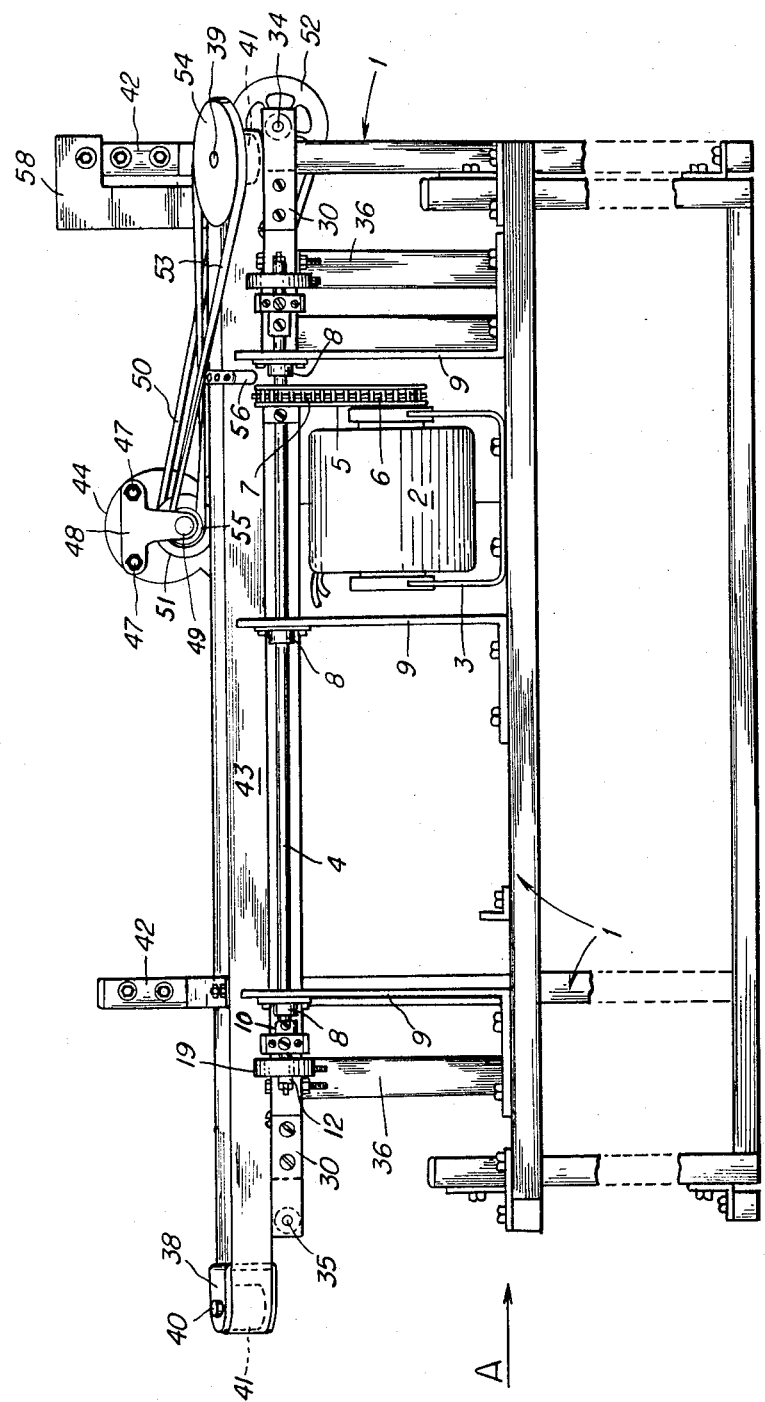

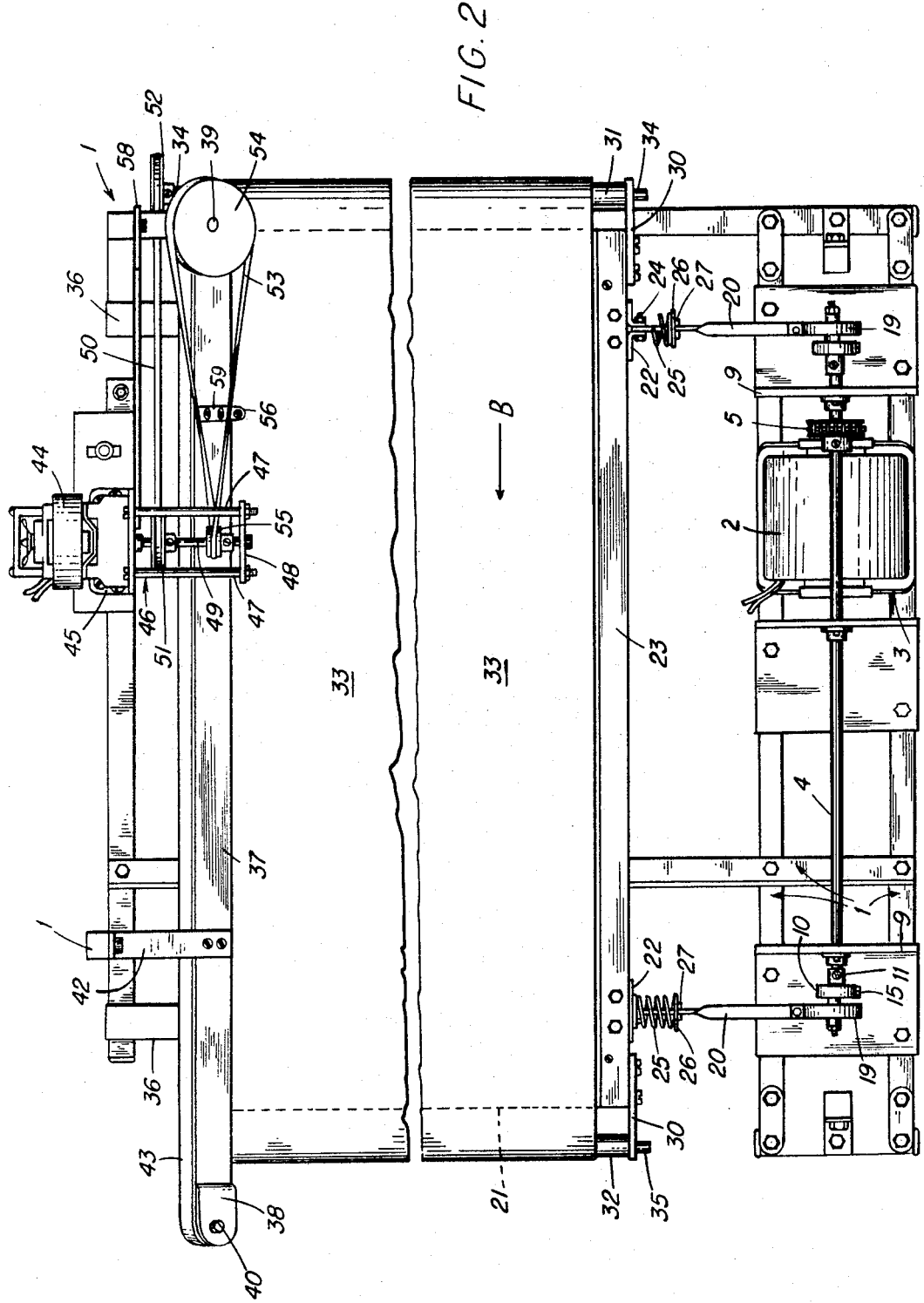

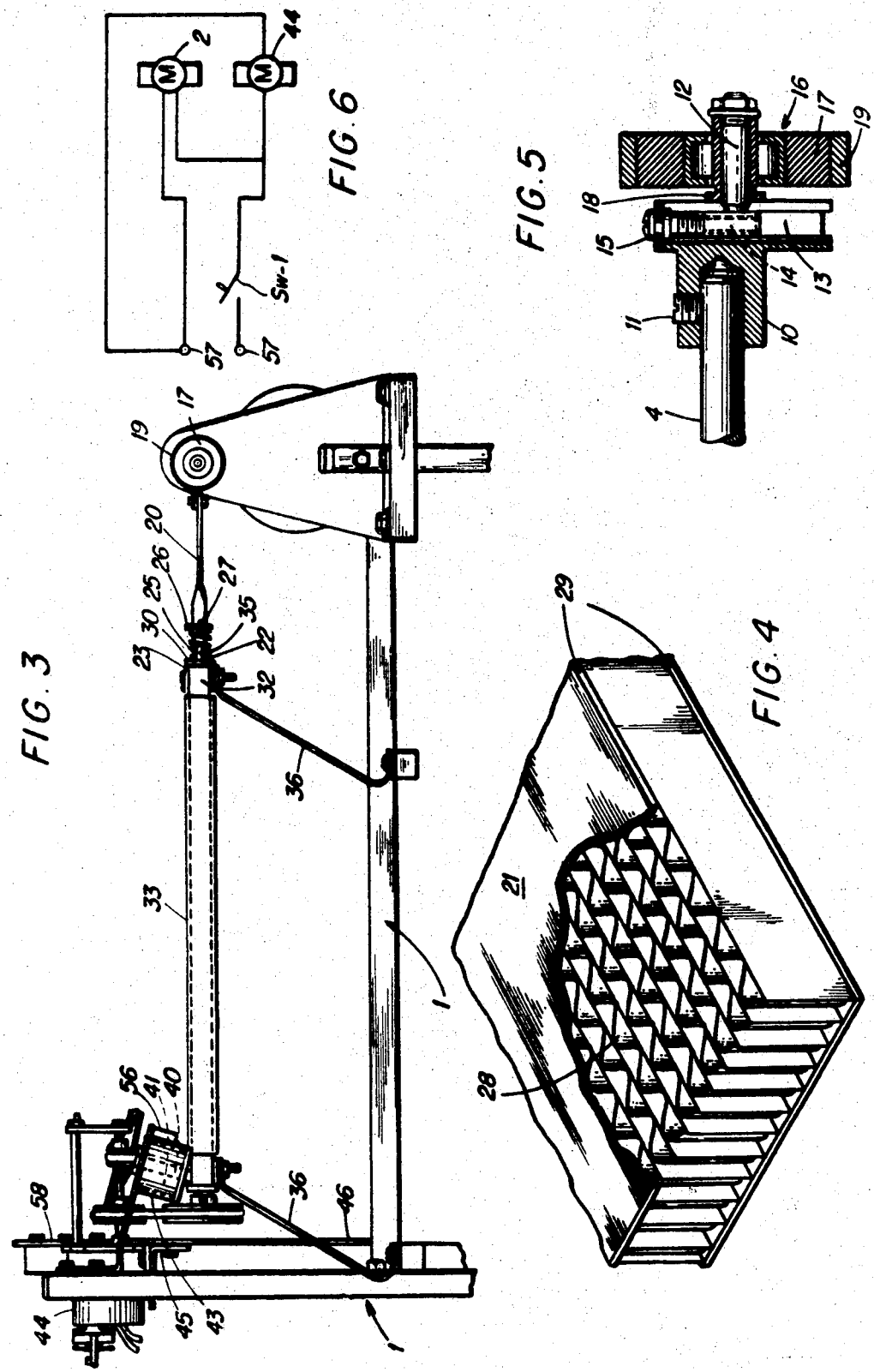

Filed June 4, 1965  4 Sheets-Sheet 4

3,388,906
VIBRATING CONVEYOR
John G. Attwood, Oak Park, and Robert L. Kosrow, Elk
Grove, Ill., assignors to Union Special Machine Company, Chicago, Ill., a corporation of Illinois
Filed June 4, 1965, Ser. No. 461,377
11 Claims. (Cl. 271—49)

ABSTRACT OF THE DISCLOSURE

An endless belt conveyor for moving flexible material work pieces to a device for subsequent handling cooperating with a vibrating conveyor which moves the work pieces across the belt conveyor into contact with a mechanism which aligns the work pieces relative to the subsequent handling device while they are being moved toward that device by the belt conveyor.

This invention relates to apparatus for conveying and manipulating workpieces made of flexible sheet material. More particularly it relates to mechanisms for automatically manipulating such work pieces into a predetermined position, and for conveying them to another device for subsequent handling.

The invention is particularly useful in the garment industry, but it may be used to advantage in other industries which have similar workpieces and workpiece handling requirements.

In the sewing and handling of workpieces, such as fabric pieces, sections of garments, or pieces of other flexible sheet material, the speed and accuracy with which operations are performed are extremely important in determining the efficiency with which the final product can be made. Heretofore, the operator's skill and speed in positioning and delivering such workpieces to sewing machines or other machines for different types of operations, have been major factors in the cost of producing the final product. Since even the most skilled operator cannot sustain a uniformly high rate and quality of work for a long period of time, rates of production have been held down to whatever speed the particular operator could manage. With different operators different rates of production were unavoidable, and it became difficult, particularly in large scale operations, to maintain costs at a reasonable figure.

For efficient mass production of garments, work pieces must be fed to the sewing machine as fast as it can take them. Efficient feeding of such workpieces to a sewing machine, however, requires not only speed, but accuracy as well. Before being fed to the sewing machine each garment section must be moved into a predetermined position so that the line of sewing will occur at the proper place. This positioning and conveying of garment sections has heretofore been done manually by individual operators with the consequent inefficiencies hereinbefore described. A quicker, more reliable way of conveying and positioning such sections has been needed to enable the manufacturer to maintain his costs at a reasonable figure and to make his operation more efficient.

It is therefore one object of this invention to provide a new and improved work handling apparatus for manipulating flexible sheet material work pieces and for transferring them to another apparatus.

Another object of this invention is to provide an apparatus, having the foregoing characteristics, which performs its functions automatically and can be used in combination with a sewing unit, or other work handling devices, or as a link between other work handling devices and a sewing unit.

Another object of this invention is to provide a machine for automatically moving flexible sheet material work pieces into a predetermined position relative to a sewing machine or other device for subsequent handling, and for simultaneously automatically conveying such workpieces to such sewing machine or other device.

A further object of this invention is to provide a machine having the foregoing characteristics which uniformly operates quickly and accurately.

A still further object of the invention is to provide a new and improved work handling apparatus having the foregoing characteristics which eliminates waste motion by the operator and other variables in the production of sewed work.

Various other objects and advantages will appear from the description of the invention hereinafter, one embodiment of which, including its novel features, will be particularly pointed out in connection with the appended claims.

Included within the scope of the invention, among other features, are a substructure framework, a vibrating conveyor, an endless broad belt conveyor associated with the vibrating conveyor, and an endless guide belt conveyor cooperating with both the vibrating conveyor and the broad belt conveyor. The substructure comprises a framework of vertical and horizontal support members connected together for carrying and supporting the three conveyors in proper relation to each other.

The vibrating conveyor includes a vibrator table supported by inclined leaf springs, and means for vibrating the table by alternately driving it first to a higher position than normal, and then back to its original lower position. The leaf springs are inclined at an angle of about 60° so that the table moves horizontally forward and back as well as up and down in its vibratory movement. The upper run of the endless belt of the broad belt conveyor rests on and is supported by the vibrator table in such a manner that it vibrates with the table when in operation. Thus, any work piece lying on the belt will be moved upwardly and horizontally during the forward portion of the vibrating stroke. During the backward portion of the stroke the table drops down and horizontally back from the workpiece which maintains its new horizontal position by virtue of the principle of inertia.

The broad belt conveyor includes a broad belt the upper run of which is placed on the vibrator table, and suitable rollers for driving the belt over and around the table are provided. The upper run of the belt is moved lengthwise over the table in the direction in which the workpieces are eventually to be fed to the sewing machine or other handling apparatus.

It is characteristic of the invention that the conveying motion imparted to a work piece, by lengthwise movement of the upper run of the broad belt along the vibrator table, is in a different direction than the motion imparted to the work piece by the horizontal vibrating movements of the table. Preferably, the force applied to the work piece due to vibrator table motion is perpendicular to the direction of travel of the broad belt. In the embodiment herein described the upper run of the broad belt carries the work pieces in the direction of their intended eventual feed, while the forces on the work pieces due to the vibrating movements of the table urge the work pieces toward one edge of the belt 90° away from the direction of intended eventual feed. The result of these two perpendicular forces on the work pieces is that the work pieces travel with the belt and across it at the same time in a diagonal movement, when seen from a fixed non-moving reference point.

The guide belt conveyor is located adjacent the edge of the broad belt towards which the workpieces are being driven. This guide belt conveyor includes an endless belt placed around rollers which are driven by the same means as the broad belt. The inner run of this belt lies adjacent the upper run of the broad belt as well as the rear edge of the vibrator table, and it is inclined slightly toward the broad belt. Its movement is synchronized with the movement of the upper run of the broad belt so they both travel in the same direction and at identical speeds. The function of the guide belt is to provide an aligning rail against which each work piece will register as it reaches the edge of the broad belt. In operation, sideways movement of each work piece continues until one of its lengthwise edges registers with the guide belt. The identity in direction and speed of travel between the adjacent runs of the two belts prevents the work piece from becoming disoriented again due to the friction between it and the belts which would be otherwise encountered. In attitude, the guide belt is placed nearly upright with respect to the broad belt. It is preferably not absolutely upright, however, but is slightly inclined toward the surface of the upper run of that belt. This inclination is useful, because it serves to keep the edge of each work piece from curling upwards as it is urged against the guide belt. The angle of inclination is not really critical, but is preferably an acute angle of about 75°.

For the apparatus to work satisfactorily it is necessary that the work piece be deposited on the receiving end of the machine in a somewhat aligned positon, because if thrown on indiscriminately the wrong edge of the work piece might become registered with the guide belt. Even so, with this apparatus an operator placing the work piece onto the machine need not have the degree of skill in prepositioning heretofore required to operators feeding work pieces into sewing machines. Moreover, if the work pieces are placed on the broad belt conveyor of this invention by a machine, the operator can be done away with completely. No additional mechanism is needed as long as the work pieces come off the machine delivering them to the apparatus of this invention in a somewhat aligned condition.

This invention can be used to automatically feed sewing machines or any other apparatus that needs flexible sheet material work pieces fed to it in a predetermined position. It may also be used in connection with other machines which are used in the handling of work pieces between a stack thereof and the sewing machine.

For a more complete understanding of the invention reference should be made to the drawings in which:

FIG. 1 is a front elevational view of the preferred embodiment of an apparatus according to the invention;

FIG. 2 is a top plan view of the apparatus of FIG. 1;

FIG. 3 is an elevational view of a portion of the apparatus of FIG. 1, looking in the direction of arrow A in FIG. 1;

FIG. 4 is an isometric view of a portion of the vibrator table with a portion of the top cover plate cut-away to show its construction;

FIG. 5 is a detail view, in section, of one of the drive eccentrics for vibrating the table;

FIG. 6 is a diagram illustrating an electrical circuit for the belt conveyor and virbating conveyor motors;

Figure 8:
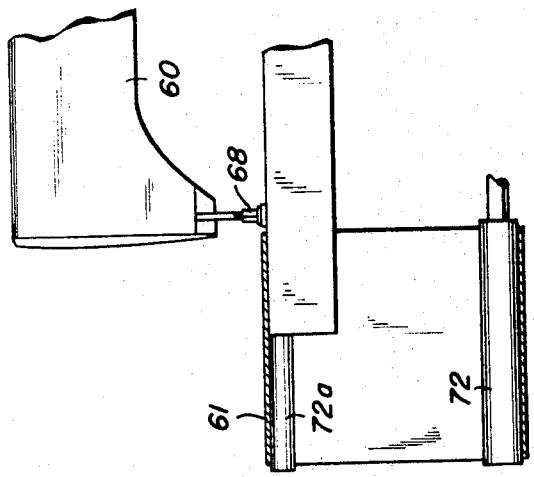
FIG. 8 is a sectional view taken along the line 8—8 of FIG. 7.

Referring now more particularly to FIGS. 1, 2 and 3 the substructure 1 of the apparatus comprises a number of vertically and horizontally disposed bars fitted together in a suitable manner to support the vibrating conveyor, the endless belt conveyor, and the guide belt conveyor.

*Vibrating table*

Referring again to FIGS. 1, 2 and 3 the vibrating table and associated devices comprise a motor 2 mounted on a supporting frame structure 3 bolted to the substructure 1 as shown. Motor 2 is connected with a vibrator shaft 4 by a drive chain 5 via chain sprocket wheels 6, 7 which are affixed to the motor shaft (not shown) and the vibrator shaft 4, respectively. Vibrator shaft 4 is rotatably journaled in bushings 8 mounted on support brackets 9 which are bolted to horizontal bars of substructure 1. At each end of vibrator shaft 4 there is an adjustable eccentric drive means (FIG. 5) for converting the rotary motion of the shaft 4 into a horizontal reciprocating motion.

Referring more particularly to FIG. 5, the eccentric arrangement comprises a vibrator shaft end member 10 which fits over the end of shaft 4 and is removably affixed thereto by a set screw 11. End member 10 carries an eccentric pin 12 parallel to, but extending beyond, the end of shaft 4. Pin 12 is adjustably mounted in a slideway 13 in end member 10 via slide 14. The position of slide 14 in slideway 13 can be changed by turning an adjusting screw 15 which is also mounted in end member 10, and one end of which is threadably engaged with slide 14. By rotating screw 15 the eccentricity of pin 12 can be varied with respect to vibrator shaft 4. Mounted on pin 12 via bearing means 16 is a wheel 17 which is spaced from end member 10 by a tube-like collar and washer member 18 carried by said bearing means 16. Collar and washer member 18 may be kept mounted in fixed axial position on pin 12 by bolting means shown in FIG. 5 and by cooperation of the washer portion of member 18 with end member 10.

Referring again to FIGS. 2 and 3, there is a strap 19 circumferentially surrounding each wheel 17. Each strap 19 is bolted to one end of a pitman 20. The other end of each pitman 20 is hingedly connected to one of the edge rails 23 of the vibrator table 21 via mounting brackets 22, and hinge pins 24. Each hinge pin 24 is mounted in a different bracket 22 via a hole (not shown) which is preferably of slightly larger diameter than the hinge pin 24 itself. In addition, there is a compression spring 25 arranged on each pitman 20 between mounting bracket 22 and a collar 26. Each collar 26 surrounds its associated pitman 20 adjacent mounting brackets 22 to keep the springs 25 under compression, and is held in place by cotter pins 27. The expanding force of springs 25 tends to force pitmans 20 away from the vibrator table edge rail 23 and this forces hinge pins 24 against the inner wall (adjacent the edge rail 23) of the hole in pitmans 20. This arrangement is preferred, because it provides less friction, less noise and smoother operating characteristics than other connecting arrangements. Other connections however between the pitmans 20 and the vibrator table 21 are possible and may be used if desired.

Vibrator table 21, as seen in FIGS. 2 and 4, is preferably rectangular in shape. It comprises a corrugated honeycomb type structure of cardboard material 28 (see FIG. 4) which is covered on its top and bottom sides with rigid plastic sheets comprising cover plates 29. Edge rails 23 are fixedly connected to vibrator table 21 to add stiffness to it.

Supporting vibrator table 21 are four leaf springs 36 which are preferably disposed at an angle of approximately 60° to the horizontal. They may be bolted to vibrator table edge rails 23 at their upper ends, and to substructure 1 at their lower ends. As shown in FIGS. 1 and 3 the orientation of leaf springs 36 is transverse to broad belt 33 rather than parallel with it. This causes vibrator table 21 to vibrate horizontally with respect to belt 33 as well as vertically, thereby inducing vibrations in the belt which convey the work pieces towards one edge of the belt.

*Broad belt conveyor*

In addition to forming the mounting structure for brackets 22, edge rails 23 comprise the mounting structure for projecting brackets 30 which support drive roller 31 and idler roller 32 for the broad belt 33. Projecting brackets 30 are mounted at the ends of rails 23. Preferably they have free ends extending in the plane of vibrator table 21, but beyond the ends of the table so as to keep rollers 31, 32 from interfering with the table ends. Rollers 31, 32 are mounted on shafts 34, 35 respectively, and shafts 34, 35 are journaled in suitable bearings (not shown) in the free ends of projecting brackets 30.

Projecting brackets 30 together with shafts 34, 35 and rollers 31, 32 provide the means by which broad belt 33 can be continuously driven around and over the vibrator table in the direction of intended eventual feed for the garment sections as shown by arrow B in FIG. 2. Belt 33 itself is preferably made of a low-friction non-static material and drive roller 31 is preferably made with an exterior coating of high friction material (not shown) so that movement may be imparted to the belt by friction.

*Guide belt conveyor*

The guide belt conveyor is located along the rear edge of the vibrator table. It includes a belt support beam 37, two roller brackets 38 affixed at opposite ends of the beam, and roller shafts 39, 40 rotatably journaled in right and left brackets 38 as seen in FIG. 2. Rollers 41 are mounted on said shafts, and belt support beam 37 is affixed to vertically extending portions of substructure 1 by carrying brackets 42, which may be bolted and screwed to substructure 1 and beam 37 respectively.

Passed around rollers 41 is the endless guide belt 43 made of high-friction material. Belt 43 is preferably inclined at an angle of less than 90° to broad belt 33 and vibrator table 21. This is done by arranging carrying brackets 42 to support beam 37, brackets 38, and shafts 39, 40 in such an inclined position. Brackets 42 are mounted on substructure 1 at a level which keeps the lower edge and inner run of guide belt 43 adjacent the upper run of broad belt 33. To keep guide belt 43 close to beam 37 one or more rollers 56 (FIG. 1) may be provided. Rollers 56 may be hung from beam 37 via brackets 59 (FIG. 2) for this purpose.

Driving both belts is a motor 44 mounted on a bracket 45 which is affixed to a mounting plate 58 connected to the rear portion of substructure 1 at the right-hand side of the apparatus as shown in FIGS. 1 and 2. Extending horizontally from the face of motor 44 toward the front of the apparatus is a motor shaft support assembly 46 comprising two bars 47. At their free front ends bars 47 are bolted to a bearing plate 48, and motor shaft 49 is journaled in and supported by a lower portion of plate 48 (FIG. 1).

Broad belt 33 receives its drive from motor 44 by means of a drive belt 50 trained around pulleys 51, 52. Pulley 52 is adjustably mounted in one end of drive shaft 34 and pulley 51 is adjustably mounted on motor shaft 49 adjacent the face of the motor. Guide belt 43 receives its drive from motor 44 by means of a drive belt 53 which is trained around pulleys 54, 55 mounted on roller shaft 39 and motor shaft 49 respectively. The sizes of pulleys 51, 52, 54, 55 and the connections of belts 50, 53 are such that the speed of travel of adjacent runs of broad belt 33 and guide belt 43 will be identical and in the same direction.

FIG. 6 shows a simple electrical circuit including live electrical terminals 57 and motors 2 and 44 connected in parallel circuit relation. A switch SW-1 is series connected in this circuit to enable both motors to be started and stopped together.

*Operation*

In operation when switch SW-1 is closed both motors 2 and 44 start running. Rotation of vibrator shaft 4 by motor 2 causes eccentric pins 12 to rotate and move along a circular path, the radius of which is determined by the adjusted position of slide 14 (FIG. 5). Wheels 17 follow this same circular path but without rotating due to the restraining action of the strap 19. Because pitmans 20 are hinged to brackets 22 by pins 24 only the horizontal motion of wheels 17 is transmitted to edge rail 23 and vibrator table 21. As table 21 is urged toward guide belt 43 it rises upwardly due to the effect of its connections with leaf springs 36. When pulled away from guide belt 43 it moves down and back. Thus table 21 is caused to vibrate.

When switch SW-1 is closed the shaft 49 of motor 44 also begins to rotate. In the embodiment shown in the drawings it rotates in a counter clockwise direction (FIG. 1) and causes pulley 54 and shaft 39 to rotate in a clockwise direction. Roller shaft 34 is driven in a counter-clockwise direction by belt 50, as are pulley 51 and pulley 52. This causes the upper run of broad belt 33 to move to the left as shown by arrow B in FIG. 2. Guide belt 43 is moved in the same direction via pulley 55 secured to shaft 49 by belt 53. It will be noted that belt 53 has been given half a twist before reaching pulley 54, so that pulley 54 is driven clockwise. This causes clockwise rotation of shaft 39 and the roller 41 connected to it thereby giving the inner or forward run of guide belt 43 the required movement.

In operation, the apparatus handles the work piece in the following manner: A work piece is placed onto the broad belt at the input end of the apparatus and is conveyed by the belt from this end to the delivery end of the conveyor mechanism. Simultaneously, the vibrations of the vibrator table are transmitted to the upper run of the broad belt causing the work piece to move horizontally across the belt towards its rear edge. This sideways movement of the work piece continues until one of its edges registers against the guide belt. Now the work piece is in its predetermined position and is conveyed to the delivery end of the apparatus for subsequent handling by the lengthwise movement of the broad and guide belts. The vibrations of the table are not strong enough to affect the orientation of the work piece once it becomes registered, nor will they drive the work piece against the guide belt so hard that the edge against the belt will curl.

Figure 7:
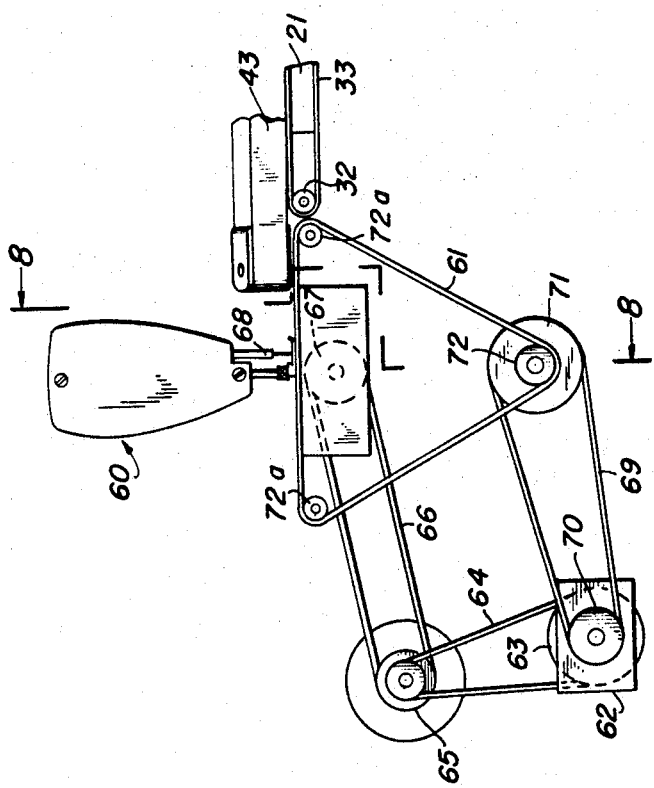
FIG. 7 is a side elevational view of a portion of a sewing machine to which the work pieces may be delivered.

From the broad belt and guide belt the work pieces are delivered in proper alignment to the next mechanism of the system, such as the sewing machine shown in FIGS. 7 and 8.

This machine, designated 60, may be of any type known in the art for producing a seam in the edge of the work piece, with or without folding of the edge to be seamed. The work is preferably delivered to the sewing machine from the broad belt 33, with the assistance of the guide belt 43, in properly aligned relation with the stitch forming mechanism onto a conveyor belt 61 which is driven at a suitable speed to carry the work pieces one after another to the sewing machine. The latter is driven at a suitable speed by connections from a driving motor 62. For this purpose the motor shaft carries a pulley 63 connected by a belt 64 with a pulley 65 which is in turn connected by a belt 66 with a pulley 67 secured to the drive shaft of the sewing machine. The work is advanced through the stitch forming zone of the sewing machine by a conventional feed dog mechanism. The sewing machine then provides a suitable line of stitching in each work piece by one or more needles 68 cooperating with complementary stitch forming mechanism in the base of the sewing machine. The work is advanced in proper alignment to the stitch forming mechanism by the belt 61 driven from motor 62 by a belt 69 connected with a pulley 70, driven at a reduced speed from the motor 62. Pulley 70 is connected by belt 69 with a pulley 71, and the latter is connected with a pulley 72 for driving the belt 61 at a further reduced speed corresponding closely with the rate of feed of the work piece through the stitch forming zone. Belt 61 is guided in a triangular path by pulley 72 and idler rollers 72a.

While a preferred form of the invention has been described in considerable detail in order to explain the nature of the invention, it will be understood that various changes in the details, materials and arrangement of parts may be made by those skilled in the art within the principle and scope of the invention as expressed in the appended claims.

What is claimed is:

1. Apparatus for automatically manipulating flexible sheet material work pieces into a predetermined position relative to a device for subsequent handling, and for simultaneously automatically conveying said work pieces to such device, said apparatus comprising; a vibrating conveyor having a vibrating table and an endless conveying belt having an upper run which moves lengthwise along the upper surface of said vibrating table, said belt being supported by said table in such a manner that in operation it vibrates with said table, as if a part thereof; whereby movement is imparted to each work piece simultaneously according to both the lengthwise movement of said upper run of the belt and the vibrations of the table, and wherein movement of said upper run of the belt over the table imparts a conveying force to said work pieces in one direction, and said vibrating table imparts an additional conveying force to said work pieces in a direction at an angle to said one direction; whereby the work pieces are conveyed in a direction that is the resultant of the two conveying forces to which they are subjected.

2. Apparatus according to claim 1 wherein said vibrating table imparts said additional conveying force to said work pieces in a direction which is perpendicular to the conveying force imparted by the travel of the upper run of said belt over said table.

3. Apparatus for automatically manipulating flexible sheet material work pieces relative to a device for subsequent handling, and for simultaneously automatically conveying said work pieces to such device, said apparatus comprising: a vibrating conveyor having a vibrating table, and a belt conveyor having a lengthwise moving endless conveying belt having one run thereof adjacent the surface of said vibrating table and cooperating therewith to simultaneously manipulate and convey said work pieces, and wherein there are work piece aligning means for orienting said work pieces into a predetermined position relative to said subsequent handling device, said aligning means being positioned for cooperation with both said conveying belt and said vibrating table adjacent and along an edge of the belt; whereby sideways movement of the work pieces across the belt will cause them to register with said aligning means, thereby moving them into said predetermined position.

4. Apparatus according to claim 3 wherein said conveying belt has an upper run which moves along, is supported by and cooperates with said vibrating table so as to vibrate with the latter, as if a part thereof, and said aligning means comprises a movable endless guide belt having an inner run positioned above and adjacent an edge of the upper run of said conveying belt and an edge of said table.

5. Apparatus according to claim 4 wherein there are means for vibrating the table transversely of the direction of movement of said conveying belt and simultaneously lifting and lowering said table so as to convey said work pieces toward said aligning means while being conveyed by the lengthwise movement of said upper run of the conveying belt; whereby said work pieces will align themselves with said guide belt and become registered in said predetermined position.

6. Apparatus according to claim 4 wherein said inner run of the guide belt lies parallel to and adjacent an edge of said upper run of the conveying belt, and wherein means is provided which moves said inner run in the same direction and at the same speed as the lengthwise movement of said upper run over said table.

7. Apparatus according to claim 6 wherein said inner run of the guide belt is inclined with respect to said upper run of the conveying belt at an acute angle.

8. Apparatus according to claim 4 wherein said inner run of the guide belt lies substantially upright with respect to said upper run of the conveying belt.

9. Apparatus for automatically manipulating flexible sheet material work pieces into a predetermined position relative to a stitch forming mechanism, said apparatus comprising: a vibrating conveyor for moving said work pieces into a predetermined aligned relation with said stitch forming mechanism, and a belt conveyor cooperatively adjacent said vibrating conveyor for carrying the work pieces one after the other from said vibrating conveyor to said stitch forming mechanism in said aligned relation, said vibrating conveyor comprising a vibrating table, and an endless conveying belt cooperating with said table and having an upper run which moves lengthwise along the upper surface of said vibrating table, said upper run being supported by said table in such a manner that in operation it vibrates with said table, as if a part thereof, aligning means along one edge of said vibrating conveyor and adjacent thereto, and means for vibrating the conveyor table in a vertical plane transversely to the lengthwise movement of the belt supported by said table so as to simultaneously convey the work pieces on said belt toward said aligning means and in the direction of the lengthwise movement of said conveying belt; whereby said work pieces will move across said belt and against said aligning means, become registered in said predetermined position and be conveyed to said belt conveyor for movement to said stitch forming mechanism in said aligned relation.

10. Apparatus for automatically manipulating sheet material work pieces relative to an aligning mechanism and for simultaneously automatically conveying said work pieces toward a device for subsequent handling, said apparatus comprising an endless belt conveyor having a moving upper run for carrying said work pieces toward said device for subsequent handling, and a vibrating conveyor which supports at least a portion of the upper run of said endless belt and vibrates said portion in a vertical plane at an angle to the direction of motion of said belt so as to simultaneously move any work piece on said portion across said upper run portion toward and against said aligning mechanism while being carried by said run toward said device for subsequent handling.

11. Apparatus according to claim 10 wherein said aligning mechanism comprises an endless guide belt conveyor having an inner run positioned adjacent said portion of the upper run of said belt conveyor for contacting and halting the movement of said work pieces across said portion and for registering them in a predetermined flat aligned relation with respect to said device for subsequent handling without curling.

References Cited
UNITED STATES PATENTS

| | | | |
|---|---|---|---|
| 2,856,741 | 10/1958 | Hartman | 53—124 |
| 2,239,858 | 4/1941 | Randolph | 198—220 |
| 3,173,656 | 3/1965 | Meste | 271—48 |
| 3,208,418 | 9/1965 | Frydryk | 271—45 |

M. HENSON WOOD, Jr., *Primary Examiner.*

R. A. SCHACHER, *Examiner.*